United States Patent [19]
Ryan et al.

[11] Patent Number: 5,390,128
[45] Date of Patent: Feb. 14, 1995

[54] ROBOTIC PROCESSING AND INSPECTION SYSTEM

[75] Inventors: Jim Ryan, Prospect, Ky.; Michael Radeke; Mark Saberton, both of Floyds Knobs, Ind.

[73] Assignee: Cargill Detroit Corporation, Clawson, Mich.

[21] Appl. No.: 44,701

[22] Filed: Apr. 12, 1993

[51] Int. Cl.⁶ .............................................. G06F 15/46
[52] U.S. Cl. ........................ 364/474.35; 318/568.23; 395/89; 901/44; 364/474.37; 364/474.18; 364/474.06; 364/551.02; 83/177
[58] Field of Search ............ 364/474.35, 474.37, 364/474.18, 551.02, 474.02, 474.03, 474.06; 318/568.1, 568.22, 568.23; 51/165.71, 165, 73, 165.74, 165.87, 317–321; 395/89, 93, 88; 901/44, 46, 47; 83/53, 177

[56] References Cited

U.S. PATENT DOCUMENTS

| | | | |
|---|---|---|---|
| 4,517,504 | 5/1985 | Honji et al. | 318/568.1 |
| 4,870,336 | 9/1989 | Nickerson | 318/568.14 X |
| 4,945,493 | 7/1990 | Huang et al. | 318/568.23 X |
| 5,006,999 | 4/1991 | Kuno et al. | 395/87 X |
| 5,047,966 | 9/1991 | Crow et al. | 364/474.37 X |

Primary Examiner—Joseph Ruggiero
Attorney, Agent, or Firm—Dinnin & Dunn

[57] ABSTRACT

Automated system for trimming and inspecting complex composite aircraft parts. A straight firing abrasive water jet head with integral catcher mounted on a first Z axis slide is numerically controlled on a six axis gantry/water jet manipulator (X, Y, Z, C, A, B axes). A touch probe mounted on a second Z axis slide is used to gauge three part points which establish part orientation in the X, Y, Z gantry/robot cell; also to adjust CNC and CMM part trim/inspection programs to actual part orientation and for peripheral dimensional inspection.

17 Claims, 4 Drawing Sheets

ROBOTIC PROCESSING AND INSPECTION SYSTEM

BACKGROUND OF THE INVENTION

Aircraft wing and empennage structures, conventionally constructed with aluminum skin surfaces, are currently employing composite materials as an alternative to aluminum. Typically, the composite is laid up on a male pattern and cured as an integral single piece, which may include for example a full wing or empennage surface. In order to trim the composite part, routing fixtures have been employed which require hard forms and special edge clamping to resist lateral edge pressure of the routing tool. Separate inspection fixtures are employed which involve substantial duplicate equipment for trimming and inspection.

BRIEF DESCRIPTION OF THE PRESENT INVENTION

Abrasive water jet cutting is employed for trimming the composite wing or empennage part which eliminates router side thrust and makes it feasible to provide part retention during trimming by vacuum means without resort to clamping. The water jet head is mounted on a Z axis mast of a gantry robot employing numerically controlled X, Y, Z linear slides at a station cell accommodating the maximum part size to be processed. The water jet head is provided with A, B and C rotary axes programmable for directional cutting relative to the part surface and for positioning a catcher receiving the water jet stream and absorbing its energy after cutting. Perimeter configuration of the part is numerically programmable relative to the X, Y, Z axes of the gantry/water jet manipulator, subject to translation to compensate for deviation of actual part location from programmed nominal positioning in the cell.

Three precise reference target points on the part, which accurately identify actual part location, are gauged by a probe separately mounted on a second Z axis mast for X, Y, Z reading and translation of offset position data used to modify the program for the water jet cutting head to conform with actual part location. The same probe is separately programmed to inspect accuracy of cutting with recorded and printed measurements indicating any deviation and confirming part trimmed within acceptable tolerance for certification.

Relative dimensional stability of composite material under temperature variations compared to thermal dimensional variation in the metal gantry robot slide structure is compensated by introducing a program modification factor based on comparing gantry robot slide measurement with known stable measurement on the part to provide an accurate compensation ratio in the absence of material temperature variations during processing of the part.

Provision is made for dissipating the energy of the abrasive water jet by discharging into a cup of hardened steel balls with plumbing to automatic waste removal.

DETAILED DESCRIPTION OF PREFERRED EMBODIMENT

Figure 1:
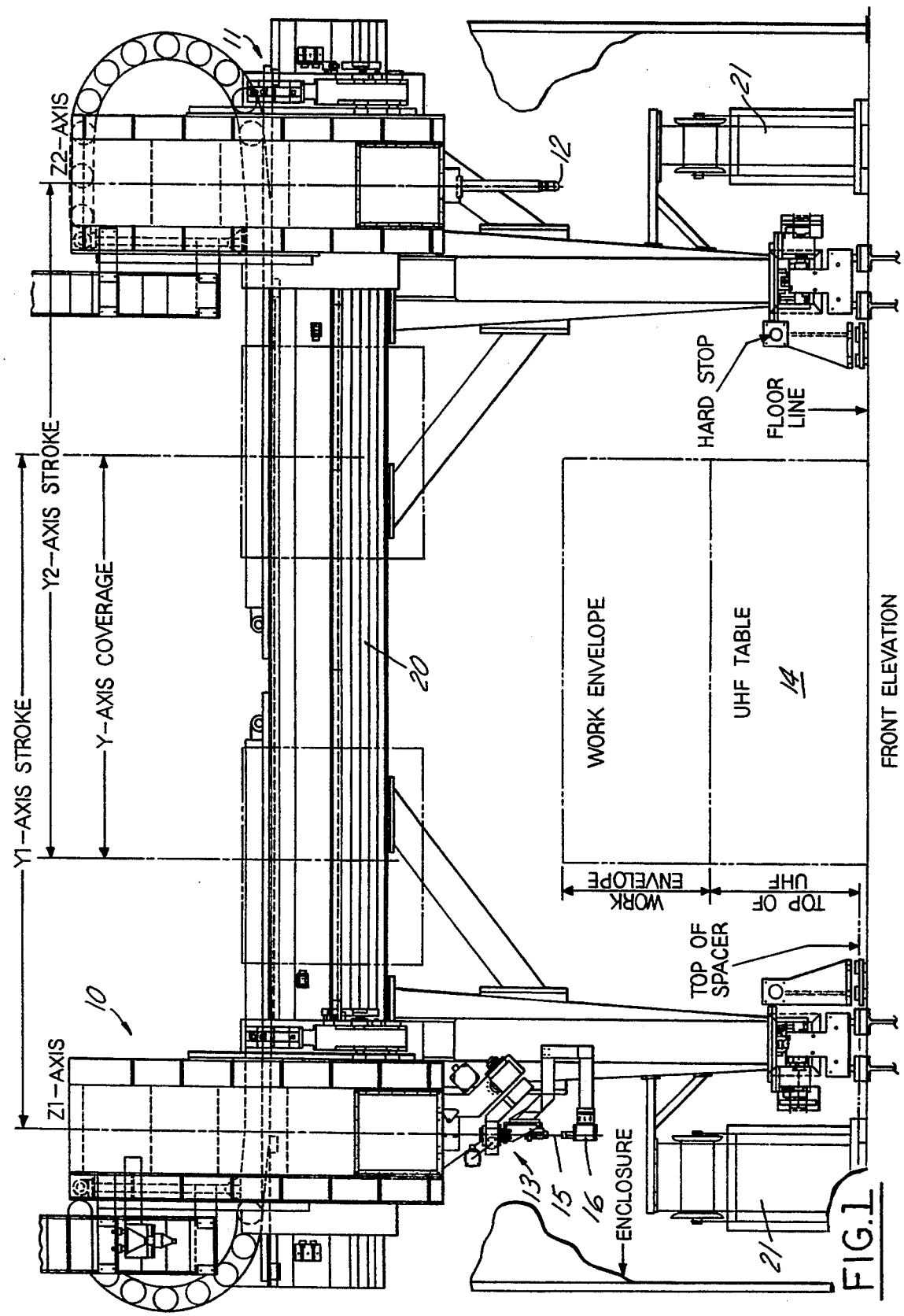
FIG. 1 is a general layout front elevation of an X, Y and Z axis gantry robot system employed in practicing the present invention.

An automated system for trimming and inspecting complex composite aircraft parts is employed in a typical system for specific use in trimming of empennage components for an advanced aircraft having composite surface parts. A designed part fabricated as a single piece of composite material is provided with three widely separated surface reference points and a computer program defining the part/position with X, Y and Z coordinates. The part is approximately located in and with coordinate reference to the empennage water jet cutting cell of the three axis gantry robot system of the present invention, illustrated in FIGS. 1–3. A $Z^1$ axis water jet head slide 10 and separate $Z^2$ axis probe head slide 11 are provided for mechanically positioning respective Computerized Numerical Control (CNC) and Coordinated Measuring Machine (CMM) heads under programmed computer controls. CMM probe 12 measures each of three reference point XYZ deviations from nominal positioning providing data for machining program modification to compensate for part position deviation. Water jet cutting is performed by CNC head 13 under nominal machining program modified to reflect actual part location deviation, and final inspection employing the same CMM probe 12 that measured the three reference point deviations is performed under a nominal inspection program as modified to reflect actual part location deviations.

Space 14 for a mounting table is provided for the component part with an electronic machining programmer defining the part location relative to the three reference points on a top surface as well as the set-up/inspection programmer for inspecting the part after water jet cutting. A Universal Holding Fixture (UHF) mounting table, not shown, for the part to be machined by water jet cutting has extendable "pogostick" locators, the upper ends of which define the underside configuration of the composite part, with suction cups to hold the interior surface into registration at all points.

The molded fabrication of the composite part as well as the UHF table mounting part trimming is outside of the scope of the present invention which may be assumed to start with the part approximately located for processing with the three reference points available for probe gauging in the three axes of the system. The reference points may be provided for example by three accurately positioned holes in the surface which may be gauged by the side of the probe along X and Y axes with the surface adjacent the hole gauged along the Z axis. Deviation data from the nominal reference point location is progressively determined by moving the probe successively to the three reference points. The nominal position of the part is coordinated with reference to the X, Y, Z axes of the water jet machining system, and by modifying the machining program to conform with the accurately measured position of the part, compensation for its location deviation is automatically provided to eliminate potential inaccuracies incident to part position deviation.

It is normal practice in the prior art router machining to remove the part after machining to an inspection station for gauging under an appropriate gauging program; however, the present system eliminates the need for such separate inspection station with duplicate X, Y, Z or equivalent slide provisions for the respective router mounting and inspection heads. Thus, the dual function of the probe in applicants' system to initially gauge the three points of reference for use in program modification followed by inspection use to gauge the part under a program correspondingly modified to reflect deviation in positioning, substantially reduces capital cost of system equipment relative to prior router systems.

Figure 2:
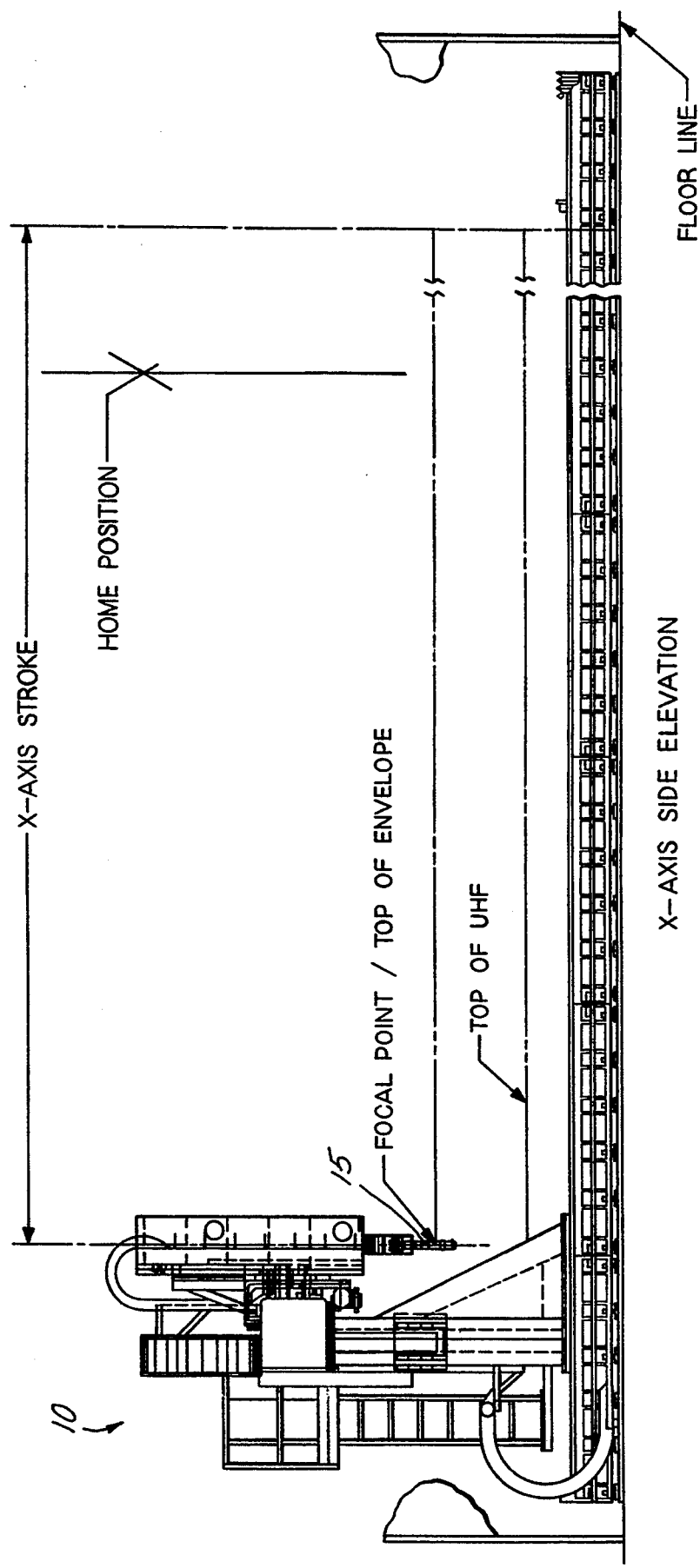
FIG. 2 is a reduced scale general layout X axis side elevation of the system shown in FIG. 1.
Figure 3:
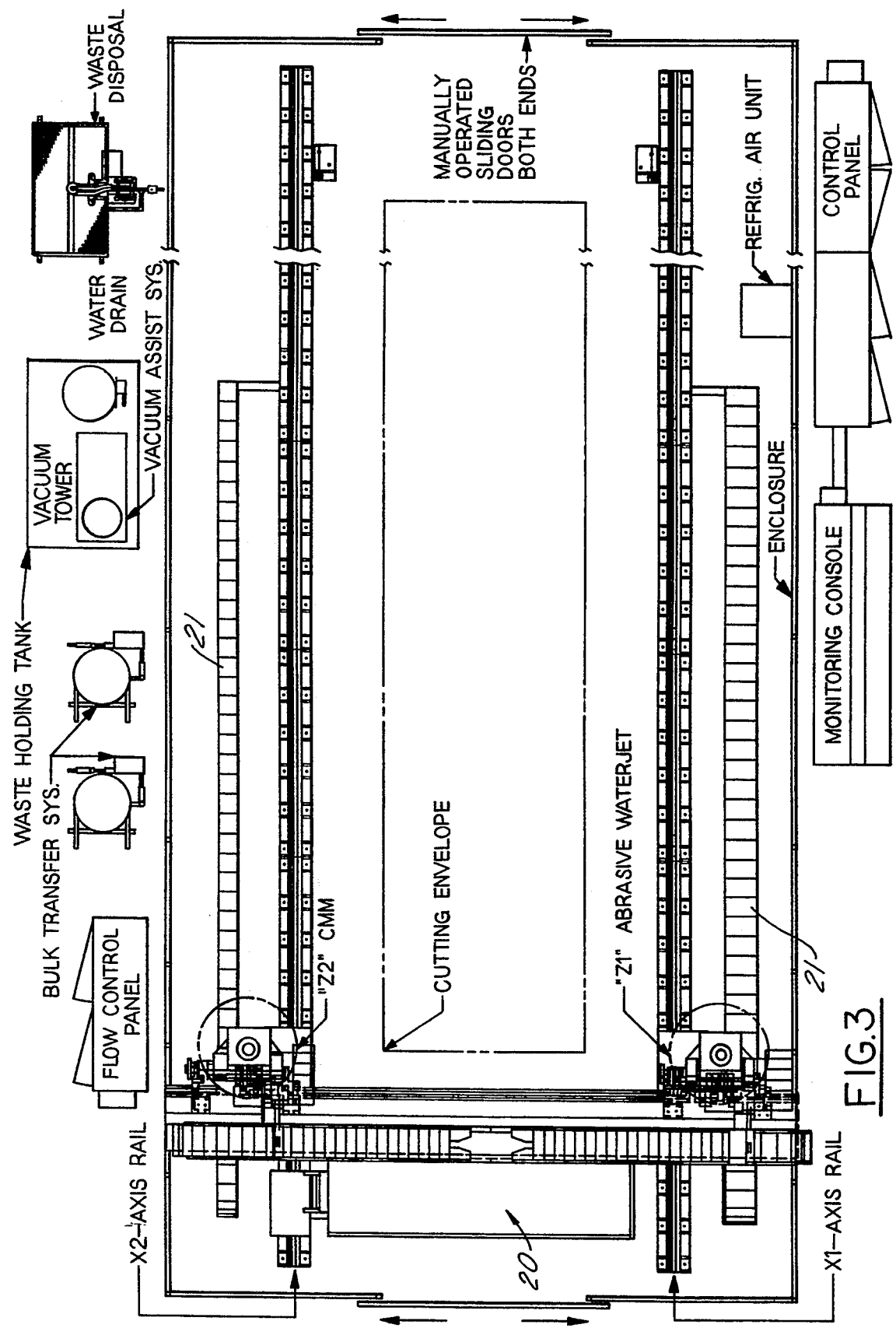
FIG. 3 is a general layout plan view having the scale of FIG. 2 showing the system of FIGS. 1–3.

With further reference to FIGS. 1-3, the system of the present invention comprises a six axis numerically controlled gantry/water jet manipulator (X, Y, Z, C, A, B axes) with two Z axes. Straight firing abrasive water jet head 13, having a focal point 15, is provided with integral catcher 16 having catcher ball bearings which dissipate energy. Robotic cutting head 13 is attached to the $Z^1$ axis members which provide A, B, and C axis motions. A axis is used for catcher positioning control. The B axis will provide rotation above a line 45 degrees to the X Y plane, its orientation being a function of the C axis rotation. The C axis will provide rotation about the Z axis member. All rotary axes intersect at a common focal point 15 in order to facilitate precise motion of the end effectors.

A Renishaw MP-11 CMM touch probe 12 is provided with taper shank, calibrated sphere, hard-wired connection to the CNC unit, with CNC communicating to a CMM PC which can print point or feature name/description, nominal, actual, ±tolerance allowed, deviation, and pass/fail information. The probe is mounted on head 17 and dedicated $Z^2$ axis mast carried by slide 11 for probing of part or fixture target points prior to machining.

The ASI PC receives the CMM DMIS program files from the customer front end processor (FEP) which are then transferred to the CMM. These files are for part location and part inspection. The ASI PC also receives the waterjet cut program from the FEP. Transformation of the part program is accomplished, as previously mentioned, by executing the part location program in the CMM PC which probes the three reference points. During probing, the CMM instructs the CNC to move the probe axes to specific destinations and when to expect probe trips. When the probe trips, the CNC probe trip axis positions are transmitted to the CMM. The CMM utilizes this information to determine the three reference point locations and to generate the transformation matrix. This information is then passed to the CNC and then from the CNC to ASI PC. The ASI PC will compare the three actual reference point locations to three nominal reference point locations defined in the waterjet cut program to ensure actual points are a reasonable representation of the part in the waterjet cut program. The ASI PC will calculate the transformation matrix and apply it to the trimming program to create a modified transformed program. This program will be transferred to the CNC by the ASI PC for later execution upon command from the cell control.

The Renishaw MP-11 touch probe is mounted on the dedicated $Z^2$ axis mast. This system is used to inspect and verify part cuts, as well as part features and shape. The CMM system's PC will serve as the control media for the inspection system. CMM software will be implemented and interfaced to enable the operator to verify predetermined points above a part's surface, and cut paths. The system will define linear axes coordinates of the system as it relates to the cut path. Part geometry of the inspection cycle is compared to nominal inspection data for certification or rejection of the finished part by the CMM computer.

The general machine of the system is a Dual Z, Dual A/B Low-Rail Gantry Robot which is AC servo motor driven and microprocessor controlled from a Fanuc 15-MAMA CNC Controller with dual PC interface for the ASI PC and the CMM PC for a part locate, cut, and inspection system. The Low Rail Gantry Robot is a free-standing unit with an all steel base frame having entry from any direction. The robot's control system is located to the side of the framework and allows operation monitoring of the system out of the work area. The Y axis bridge moves along linear bearings mounted on both sides of the robot's X axis envelope to provide indicated Y axis coverage of the work envelope.

The control can integrate any one of the optional CNC control systems with an IBM compatible PC in a single enclosure. The ASI PC and CNC will communicate via a factory communications module in the CNC. The ASI PC will provide communication link to the FEP for file downloads from the FEP. The ASI PC acts as the cell control via operator menu selections to command and sequence the CNC and CMM PC operations and to provide monitoring status to the operator.

The General Electric Fanuc S-15 MAMA system controls up to eleven axes of servo control and part program storage memory 320M. Controller includes synchronous control for driving gantry machines, parallel axis control for simultaneous movement of Z or more axes by the same program address.

In summary, the machine comprises a steel crossrail supported on a pair of raised independent ways which provide the X axis travel of the machine. An additional set of ways are attached to the crossrail on which a cross saddle rides providing the Y axis. The cross saddle houses two vertical slides providing separate travel for the abrasive cutting head and the inspection probe.

The cutting/trim cell includes two independent dedicated systems mounted on a common X axis rail and drive system control by a single CNC system. The cutting/trimming system is a six axis system with abrasive cutting abilities and the measurement system is a three axis system with a Renishaw MP-11 probe. The cell will enable automatic part locating, program downloading with transformations completed, and upon completion of the trim/cut cycle, actual part measurement and certification of the part, all in the same cell.

Figure 4:
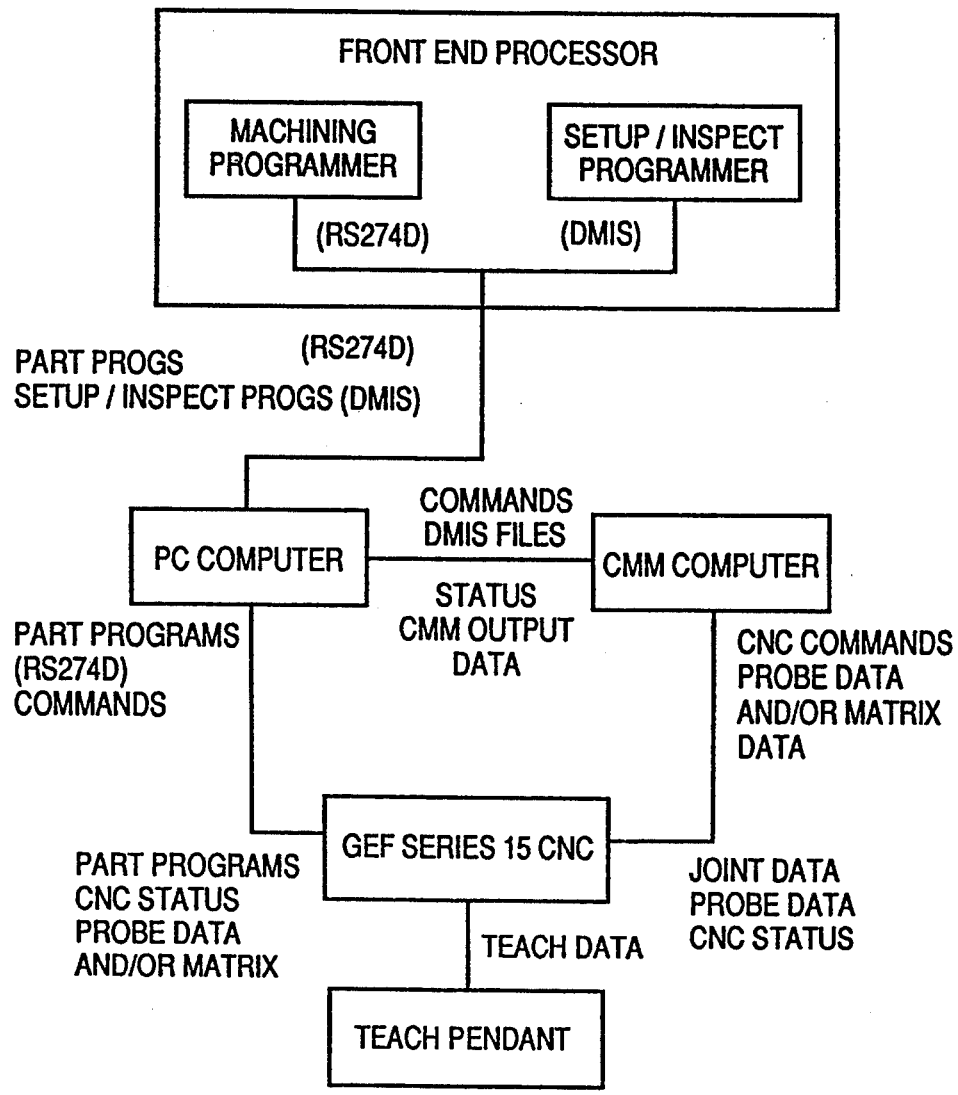
FIG. 4 is a block diagram of system control architecture.

With reference to FIG. 4, the general architecture of the system is shown in block diagram indicating a GE Fanuc Series 15 CNC for motion control and machine interface and two IBM PC/AT style computers to implement the cell level control and the CMM control.

We claim:

1. Automated system for trimming and inspecting parts comprising computer programmable means for geometrically defining a part program responsive CNC means at a trimming station for trimming a program defined part, means for locating a part to be trimmed at said station, means for gauging any offset in the actual position of said part relative to programmed position for trimming by said CNC means, means for transforming the CNC program to comply with said actual position in performing said trimming operation, and correspondingly transformed program responsive CMM means for inspecting the trimmed part at said station.

2. System of claim 1 including an X, Y, Z axis Gantry Robot providing a work cell for performing trimming and inspection operations.

3. System of claim 1 wherein said means for trimming provides linear cutting action.

4. System of claim 3 including means for providing said linear cutting action in a direction normal to the surface of said part being trimmed.

5. System of claim 3 wherein said linear cutting action comprises an abrasive water jet.

6. System of claim 4 wherein said linear cutting action is provided by two axis head means for adjusting the linear angle at a constant focal point.

7. System of claim 6 including water catching means spaced from said focal point for absorbing energy of said abrasive water jet following its cutting action.

8. System of claim 7 including a third axis mounting means for said catcher to maintain its alignment with said linear cutting action.

9. System of claim 2 including a Z axis mast for mounting said CNC means, and a separate Z axis mast for mounting said means for gauging, with separate computer programmable controls for independently operating each means.

10. System of claim 1 wherein said means for gauging includes means to gauge the position of three reference points on said part indicating the actual location of said part relative to said trimming station.

11. System of claim 2 wherein said means for gauging includes means for inspecting the part following said trimming action.

12. System of claim 10 wherein said means for gauging comprises a probe with means for gauging the X, Y, Z position of each reference point to establish the exact location of said part at said trimming station.

13. System of claim 1 including means for trimming and inspecting complex composite parts.

14. System of claim 1 including means for trimming and inspecting complex composite aircraft parts.

15. System of claim 5 wherein said means for locating a part to be trimmed includes universal holding fixture means for retaining a part on a multiplicity of adjustable locators set to a master surface corresponding to the underside of said part, and including vacuum means on said locators for retaining said part against shifting during the trimming operation.

16. System of claim 1 including temperature compensation means for modifying the CNC trimming program for differentials in thermal expansion between the part and the station structure.

17. System of claim 16 including means for comparing known dimensions on relatively low coefficient composite part with the corresponding measurement of the CNC machine using the ratio determined by such measurement for modifying the CNC program to match the actual part dimensions.

* * * * *